United States Patent [19]

Fukunaga

[11] Patent Number: 4,614,258

[45] Date of Patent: Sep. 30, 1986

[54] AUTOMATIC SPEED CHANGE CONTROL METHODS FOR SELF-MOVABLE VEHICLE

[75] Inventor: Takao Fukunaga, Hirakata, Japan

[73] Assignee: Kabushiki Kaisha Daikin Seisakusho, Neyagawa, Japan

[21] Appl. No.: 629,427

[22] Filed: Jul. 10, 1984

[30] Foreign Application Priority Data

Jul. 27, 1983 [JP] Japan .................................. 58-138085

[51] Int. Cl.⁴ ........................................... B60K 41/28
[52] U.S. Cl. .............................. 192/0.052; 192/0.073; 192/0.076; 192/0.09
[58] Field of Search ............... 192/0.042, 0.044, 0.052, 192/0.076, 0.075, 0.09, 103 R, 0.073

[56] References Cited

U.S. PATENT DOCUMENTS

| | | | |
|---|---|---|---|
| 3,881,368 | 5/1975 | Furuhashi et al. | 74/866 |
| 3,903,759 | 9/1925 | Hashimoto | 74/866 |
| 4,103,764 | 8/1978 | Iijima | 74/866 |
| 4,350,234 | 9/1982 | Suga et al. | 192/0.055 X |
| 4,369,676 | 1/1983 | Gaus | 74/877 X |
| 4,393,964 | 7/1983 | Kemper | 192/0.076 X |

Primary Examiner—George H. Krizmanich
Attorney, Agent, or Firm—Bradford E. Kile

[57] ABSTRACT

An automatic speed change control method for a self-movable vehicle wherein, during running of a self-movable vehicle of a type that a power of an engine is transmitted to driving wheels through a clutch and a finite-stage gear speed changer, a speed-change ratio is calculated from both an actual speed and an acceleration pedal stepping value, the clutch is disengaged after detecting the above speed change ratio having been equal to a next present speed-change ratio, next gears are meshed with a prescribed time delayed, characterized by that, only when the acceleration pedal stepping value is detected to be zero during running of the vehicle on a high-speed stage and at the same time the actual vehicle speed is larger than a prescribed preset vehicle speed at which a gear mode is to be changed to a low-speed stage, the gear mode is forcibly changed to the low-speed stage to enable an engine brake to function more effectively.

7 Claims, 5 Drawing Figures

4,614,258

AUTOMATIC SPEED CHANGE CONTROL METHODS FOR SELF-MOVABLE VEHICLE

FIELD OF THE INVENTION

This invention relates to a control method which permits a driver to perform full-automatic speed changing by only using an acceleration pedal and a brake pedal without operating a speed changer in an automobile of a type that power of an engine is transmitted to driving wheels through a clutch and a speed changer having a finite number of gear trains, and is mainly suitable for industrial vehicles such as an automobile, a fork-lift etc.

DESCRIPTION OF THE PRIOR ART

An automatic speed-change control method for an automobile has already been proposed, which has been so designed that, during running of a self-movable vehicle of a type that power of an engine is transmitted to driving wheels through a clutch and a finite-stage gear speed changer, a speed-change ratio is calculated from both actual vehicle speed and an acceleration pedal stepping value, the clutch is disengaged after detecting the above speed-change ratio having been equal to a next-step preset speed-change ratio. Next gears are meshed with a prescribed time delay and the clutch is engaged with a further prescribed time delay.

In the above conventional construction, however, there has been at least one disadvantage in that, especially during half-speed running of a vehicle, a brake mechanism is liable to be overdriven because it is required to strongly apply a brake pedal in a braking operation due to ineffective functioning of braking action from the engine.

SUMMARY OF THE INVENTION

In consideration of the above-mentioned disadvantage, an object of this invention is to automatically change a gear-meshing mode to a low-speed side as required, to enable and engine brake to function more effectively in instances of deceleration during high-speed running.

In order to accomplish the above object, in this invention; in an automatic speed-change control method is provided for a self-movable vehicle which is so designed that, during running of the self-movable vehicle, of a type that power of an engine is transmitted to driving wheels through a clutch and a finite-stage gear speed changer, a speed-change ratio is calculated from both actual vehicle speed and an accleration pedal stepping value. The vehicle clutch is disengaged after detecting the above speed-change ratio having been equal to a next-step preset speed-change ratio. Next gears are meshed within a prescribed time delayed, and the clutch is engaged with a further prescribed time delayed. When an acceleration pedal stepping value is detected to be zero during running of the vehicle at a high-speed stage and at the same time actual vehicle speed is larger than a prescribed reset vehicle speed at which a gear mode is to be changed to a low-speed stage, the gear mode is forcibly changed to the low-speed stage to enable an engine brake to function more effectively.

DETAILED DESCRIPTION OF THE INVENTION

Figure 1:
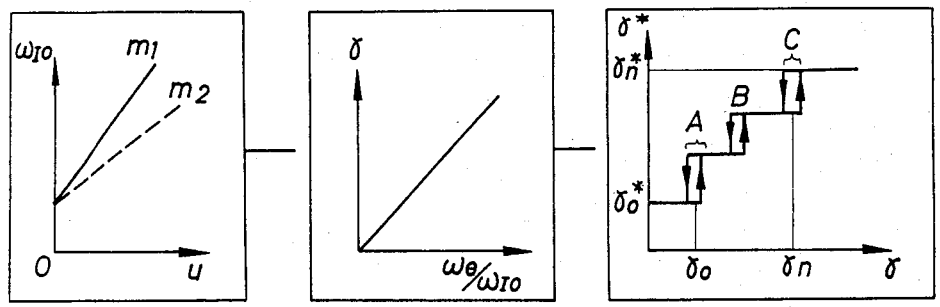
FIG. 1 is a diagram showing a method of presetting an actual speed-change ratio.

In FIG. 1 shows a calculation concept of a speed change point. An electronic computer applied to this invention calculates the speed change point (vehicle speed at which the speed-change operation is performed) from relations between three values: a speed-change mode selected by a driver, that is; a mode $m_1$ changing speed at the time when an engine generates its maximum power or a mode $m_2$ changing speed at the time of economical power when its fuel consumption becomes minimum, an acceleration pedal stepping value u (for each mode $m_1$ and $m_2$) and actual vehicle speed $w_\theta$. After the speed change $m_1$ or $m_2$ is selected, a target engine rotational speed $w_{IO}$ for each acceleration pedal stepping value u is calculated (note the left end figure of FIG. 1). Here, $i_d$ shows an idling point). Then, a ratio $w_\theta/w_{IO}$ of the vehicle speed $w_\theta$ to the target engine rotational speed $w_{IO}$ is calculated for a desired ideal speed-change ratio $\gamma$ (note the central figure of FIG. 1). Finally, the speed-change ratio $\gamma$ which is a continuous value as converted to a steplike actual speed-change ratio $\gamma^*$ ($\gamma_1^*$ to $\gamma_n^*$) corresponding to a speed-change ratio of a gear train of an actual vehicle by means of a window-type comparator with hysteresis. By this method, a speed-change point, at which a speed-change mode desired by a driver which matches with a desired vehicle running condition, is determined.

Figure 2:
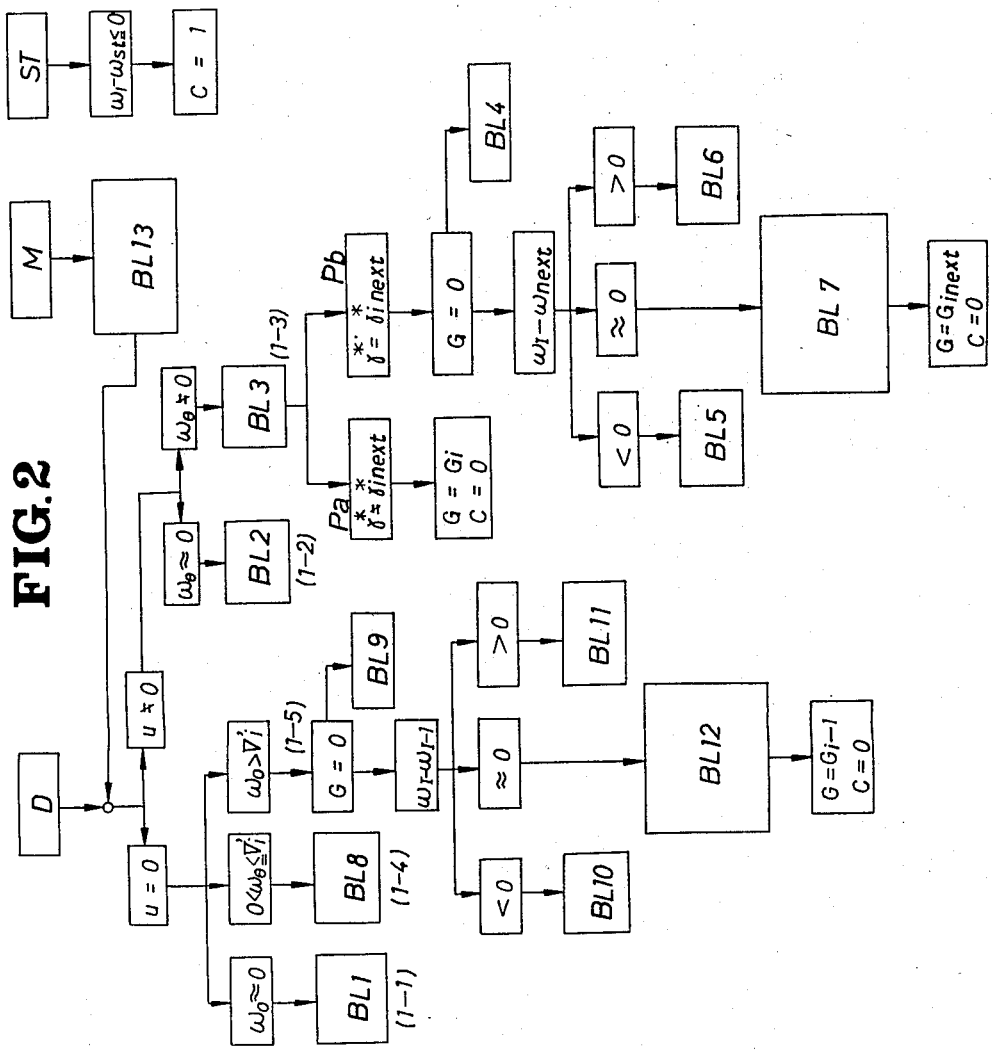
FIG. 2 is a control block diagram.

The automatic speed change control system will be described hereunder by using a control block diagram shown in FIG. 2. In FIG. 2, D designates an automatic speed change, M designates a manual speed change, u designates an acceleration pedal stepping value, $w_\theta$ designates a vehicle speed, $w_I$ designates an engine rotational speed, $w_s$ designates a stall rotational speed, $w_{next}$ designates a clutch rotational speed of a next stage, C designates a clutch (C=1 means disengagement and C=0 means engagement.), $\gamma$ designates a speed-change ratio, $\gamma^*$ designates an actual speed-change ratio, G designates a gear (G=0 means neutral and $G_{i\text{-}next}$ means a gear next to i), and i designates a number of stage respectively. Further, (1-1) to (1-5) in FIG. 2 correspond to the following explanatory classifications:

(1) In case of a shift lever being set to D (automatic) range:

(1-1) When the vehicle is stopped and the acceleration pedal stepping value is zero ($w_\theta=0$, u=0), the gear is set to the first stage in BL1 block and the vehicle is standing ready for rapid starting with the clutch disengaged (c=1). This condition corresponds to that which, in FIG. 3, a signal from a detecting circuit 11 closes a relay 2 to further close a clutch disengaging relay 5 and energize a clutch operating solenoid valve 22 to disengage the clutch.

(1-2) When the vehicle is stopping and the acceleration pedal is stepped ($w_{74}=0$, $u\neq 0$), the gear is in the first stage in BL2 block and the clutch is smoothly engaged to start moving the block. Namely, the actual speed-change ratio $\gamma^*$ calculated by the speed-change ratio computing circuit (window-type comparator circuit) is calculated as described above according to inputs of the vehicle speed $w_\theta$ (converted to an electric voltage) and the acceleration pedal stepping value u (converted to a resistance value of variable resistor) (FIG. 1). Since the vehicle speed $w_\theta$ is zero in this instance, the speed change ratio $\gamma_i$ is zero. Therefore, the gear is set to the first stage, then the clutch is smoothly engaged to start moving the vehicle.

(1-3) When the vehicle is running and the acceleration pedal is stepped ($w_\theta \neq 0$, $u \neq 0$), the automatic speed change controlling unit functions in BL3 block to calculate the speed-change ratio $\gamma$ according to the vehicle speed $w_\theta$ and the acceleration pedal stepping value u. In case when the calculated speed-change ratio $\gamma$ ($\gamma^*$) is not equal to a next preset speed-change ratio $\gamma_{i-next}$ ($\gamma_{i-next}^*$), the speed change is not executed. Namely, a control at $P_a$ side of FIG. 2 is executed. In case when the speed-change ratio is equal to $\gamma_{i-next}$, a control at $P_b$ side of FIG. 2 is executed. For a speed changer equipped with a synchro-mesh gear, the clutch is immediately disengaged to change a gear mode to a next stage. While, for a speed changer equipped with no synchromesh gear, the clutch is once disengaged in BL4 block to shift the gear mode to the neutral stage, then the clutch is engaged again.

Then, the clutch is disengaged after meshing gears are synchronized (by forcedly changing a throttle opening u* regardless of the acceleration pedal stepping value u) through operation of an engine throttle control section $X_3$ (FIG. 3), and the gear mode is changed from the neutral stage to the next stage. Namely, the throttle opening u* is made large in BL5 block in case of $(w_I - w_{next}) < 0$ or the throttle opening u* is made small in BL6 block in case of $(w_I - w_{next}) > 0$, and at the same time a state of $(w_I - w_{next}) \approx 0$ is accomplished by using an exhaust brake. When the state $(w_I - w_{next}) \approx 0$ is brought about, the clutch is disengaged and the gear mode is changed to the next stage ($G_{i-next}$) in BL7 block showing a clutch-gear operation sequence, then the clutch is smoothly engaged. Thereby, the speed change to the next stage is completed.

(1-4) When the vehicle is running and the acceleration pedal stepping value is zero ($w_\theta \neq 0$, $u = 0$) with the vehicle speed $w_\theta$ being smaller than or equal to a preset vehicle $V'_i$ (i=2, 3, ...; i is speed change stage no. under meshing) ($0 < w_\theta \leq V'_i$), the gear mode is not changed (G is fixed) and the clutch is kept engaged (c=0) in BL8 block to provide appropriate engine brake. The preset vehicle speed $V'_i$ indicates an upper limit vehicle speed offering enough engine brake effect during deceleration of a vehicle at the stage no. i, and is preset for each stage no. i in advance.

(1-5) When the vehicle is running and the acceleration pedal stepping value is zero ($w_\theta \neq 0$, $u = 0$) with the vehicle speed $w_{74}$ being larger than a preset vehicle speed $V'_i$ ($w_\theta > V'_i$), the clutch is disengaged once and the gear mode is changed to the neutral stage (G=0) in BL9 block, then the clutch is engaged again. Meshing gears are synchronized in BL10, BL11 blocks as with BL5, BL6 blocks, then the clutch is disengaged in BL12 block as with BL7 block. The gear mode is changed from the neutral stage to one-stage low-speed side, then the clutch is smoothly engaged. Since the gear mode is shifted to the low-speed side, a sufficient engine brake effect will be obtainable.

(2) In case of a shift lever being set to M (manual) range:

In this case, a speed change signal corresponding to a desired $M_i$ stage is delivered to make manual speed change possible. In BL13 block, a micro-switch attached to the shift lever gives a speed change signal corresponding to a desired $M_i$ stage to a preset circuit of each speed-change ratio $\gamma$. A relay actuating circuit 9 (FIG. 3) responding to a window-type comparator speed-change ratio $\gamma_i^*$ actuates a relay 1 corresponding to the $M_i$ stage, then clutch operation and gear change are performed.

(3) Engine stop preventive mechanism

In the event when a large load is supplied on an engine during speed changing or starting to have the engine be ready to stop (an engine rotational speed $w_1$ gets to a minimum stable rotational speed), a signal from an engine stall preventive circuit 10 (FIG. 3) causes a relay 7 to close, electric current to flow in a line 33 a clutch disengaging relay 5 to close, and energizes a clutch operating solenoid valve 22 to disengage the clutch, thus the engine stop being avoided.

(4) Control of throttle servo

This control is used to have gears mesh easily. A clutch rotational speed $w_{next}$ at the time of next speed changing is calculated by a computer with reference to a calculated value of vehicle speed $w_\theta$ running at present, thus a throttle being so controlled as to equalize the calculated value with the engine rotational speed $w_I$. The control is executed in such a manner that the throttle valve is opened when the engine rotational speed is smaller than a target clutch rotational speed; and the valve is closed and at the same time an exhaust brake is made function, if equipped, when the engine rotational speed is larger than the target speed. When the speed $w_I$ becomes approximately equal with the speed $w_{next}$; the clutch is disengaged (C=1), the gear mode is shifted to a next stage (G=$G_{i-next}$), and the clutch is smoothly engaged again. This control is executed by a sequence control including no malfunction.

Figure 3:
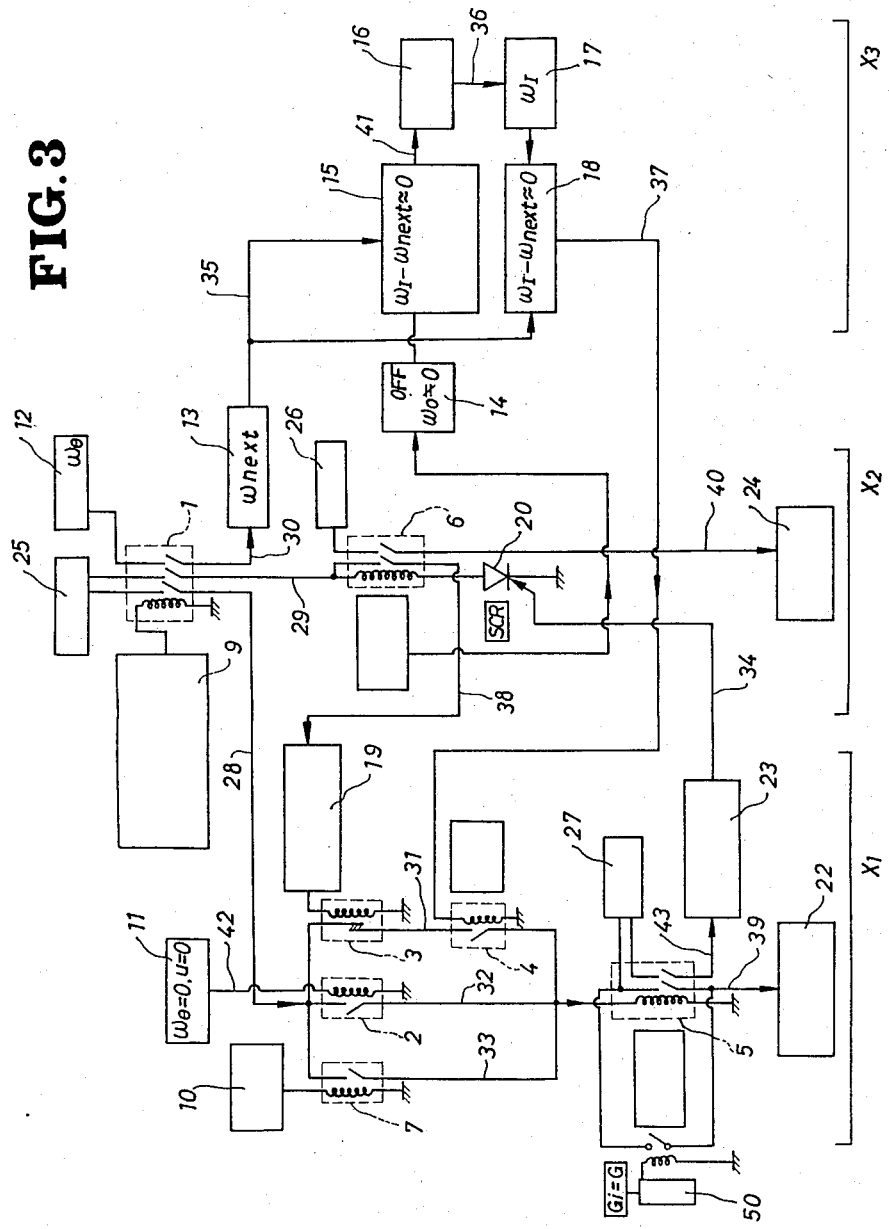
FIG. 3 is a circuit diagram.

The automatic speed change control circuit will be described hereunder. This circuit consists of three sections: a clutch control section $X_1$, a gear shift control section $X_2$ and the engine throttle control section $X_3$ as shown in FIG. 3, and they correlate each other. Composition and function of circuit under major operating conditions and running conditions will be described hereunder.

In FIG. 3, 1 is a triple normally-open relay and forms a counterpart to the relay actuating circuit 9 responding to the window-type comparator speed-change ratio $\gamma_i^*$ provided in parallel with a speed-change ratio detecting circuit, and there exist such pairs of the relay 1 and the relay actuating circuit 9 corresponding to a number of speed-change stages (for instance, four pairs). A thyrister 20 described later is provided on every pair, continuity of the thyrister 20 causes a corresponding gear operating solenoid valve 24 to be energized, thus a gear train being meshed which will give a speed-change ratio $\gamma_i^*$ specified by the window-type comparator.

(1) $W_\theta = 0$, u=0 (in case when the vehicle is stopping and the acceleration pedal stepping value is zero):

At the time when the vehicle speed is zero, the speed-change ratio $\gamma_i^*$ corresponding to the first stage gear is calculated by the relay actuating circuit 9 provided in parallel with the speed change-ratio detecting circuit ($\gamma_i = 0$ in this case because the vehicle is stopping) and the relay 1 corresponding therto functions. Moreover, since in this instance a trigger gate current is not sent to the thyrister 20 yet, a line 29 is not energized and consequently a normally-open relay 6 does not function too. The thyrister 20 will functions to close the relay 6 only after an electric current is sent to a line 34 described later to give the trigger current thereto and energize the line 29. When a $w_\theta=0$ and $u=0$ detecting circuit 11 at the left end of FIG. 3 functions at this moment; a current is sent to a line 42, a normally-open relay 2 functions (closes), to cause the current to flow through a power supply 25 and lines 28, 32, the normally-open clutch disengaging relay 5 functions (closes), and consequently the clutch operating solenoid valve 22 is energized from a power supply 27 through a line 39 to disengage the clutch. In this instance, a current is sent from the power supply 27 through a line 43 to a clutch gear operating sequence delay 23 and the current is given to a trigger gate of the thyrister 20 from the line 34 with a prescribed time delayed after a clutch disengaging current being given to the solenoid valve 22, so that the thyrister 20 is energized, an electric current flows through the line 29, whereby the relay 6 corresponding to the first stage (there exist other relays of quantity corresponding to other gear stages) functions, a current flows from a power supply 26 through a line 40 to the gear operating solenoid valve 24 and the first stage gears mesh each other. Closing of the relay 6 causes a gear clutch operating sequence delay 19 to be energized from the power supply 25 through the lines 29, 34, then a normally-open relay 3 is energized with a prescribed time delayed after a gear-mesh signal current being fed to the solenoid valve 24 to disconnect a line 31. Namely, in case when the $w_\theta=0$ and $u=0$ detecting circuit 11 is functioning, the relay 5 is energized through the lines 42, 32 to bring about a waiting condition that the gear mode is in the first stage and the clutch is disengaged.

(2) $w_\theta \neq 0$, $u \neq 0$ (in case of speed change during running of vehicle):

When the speed-change ratio $\gamma$ gets to the next speed change ratio $\gamma_{i\text{-}next}*$; the relay 1 functions, which corresponds to $\gamma_{i\text{-}next}*$ calculated by the relay actuating circuit 9, to cause the power supply 25 to connect through the lines 28, 31 to the relay 5 and close the relay 5, the clutch operating solenoid valve 22 is energized to disengage the clutch and at the same time the previous stage relay actuating circuit 9 is unenergized (the speed-change ratio detecting circuit changes the relay actuating circuit to the next stage relay actuating circuit 9), so that an electric current passing through the previous stage thyrister 20 becomes zero to cause no electric current to flow through the previous stage line 29, and consequently the relay 6 opens to restore the previous stage gear operating solenoid valve 24 to the neutral condition. A synchronizing relay 4 in the line 31 connects through a line 37 to a $(w_i - w_{next}) \approx 0$ detecting circuit 18, so turning "ON" of the circuit 18 will cause the relay 4 to close to connect the line 31. The relay 3 is closing in this instance.

In order to make the speed change to the next stage easy, an engine throttle is to be controlled with the clutch kept connected to the engine. The manner of this control will be described hereunder.

Since the relay actuating circuit 9 is functioning, the relay 1 closes to send a signal from a vehicle speed $w_\theta$ detecting circuit 12 through a line 30 to a next stage gear rotational speed calculating circuit 13, and $w_{next}$ is calculated thereat. Then, a signal from a line 35 is sent to a throttle servo circuit 15 for comparing the $w_{next}$ with the engine rotational speed $w_i$, and an output from the throttle servo circuit 15 is sent through a line 41 to an engine throttle operating valve circuit 16. The engine rotational speed is regulated thereat and a signal thereof is passed through the detecting circuit 18 which checks the $w_{next}$ for being synchronized with the engine rotational speed $w_i$, thus the engine throttle being controlled.

An electric current is sent through the line 37 to a relay 4 after the above both values have approximately synchronized each other, so that the relay 4 closes to send an electric current from the power supply 25 through the lines 28, 31 to the relay 5, thus the clutch 22 is energized to disengage itself. At the same time, a power supply 27 connects through the line 43, the sequence delay 23, the line 34 to the trigger of the thyrister 20, the thyrister 20 is energized to close the relay 6, thus the gear operating solenoid valve 24 being energized to perform gear meshing operation.

Since the relay 6 is functioning during the above control operation, the electric current flows through a line 38 and the gear-clutch operating sequence delay 19 to energize the relay 3, the line 31 is cut off with a prescribed time delayed after the gears are meshed, thus the electric current to the relay 5 is cut off to open the relay 5. Thereby, the supply of electric current to the clutch operating solenoid valve 22 is stopped so that the clutch is engaged again. Namely, the clutch is always kept disengaged during the gear meshing operation.

(3) $0 < w_\theta \leq V'_i$, $u=0$ (in case of the acceleration pedal stepping value being zero during running of vehicle at a speed lower than the preset value $V'_i$):

The speed-change ratio in the relay actuating circuit 9 is fixed to maintain a condition with which the vehicle has been running in order not to execute an unnecessary control. Thereby, an appropriate engine brake becomes obtainable.

(4) $w_\theta > V'_i$, $u=0$ (in case of the accleration pedal stepping value being zero during running of vehicle at a speed higher than the preset value $V'_i$):

The relay actuating circuit 9 of one-stage lower speed side functions to cause the corresponding relay 1 to close. Thereby, the relay 5 closes to disengage the clutch and at the same time the previous stage relay actuating circuit 9 becomes unenergized, so that the previous stage solenoid valve 24 is restored to the neutral state. Further, the rotational speed synchronizing control is executed in the same manner as described in the paragraph (2), and the gear mode is forcible changed to one-stage lower speed side. Thereby, a sufficient engine brake effect is obtained.

Incidentally, in FIG. 3, 14 is a detecting circuit for detecting all gears being not meshed and $w_\theta \neq 0$, 10 is a stall detecting circuit, 7 is a relay, 50 is a short-time clutch disengagement holding circuit.

Figure 4:
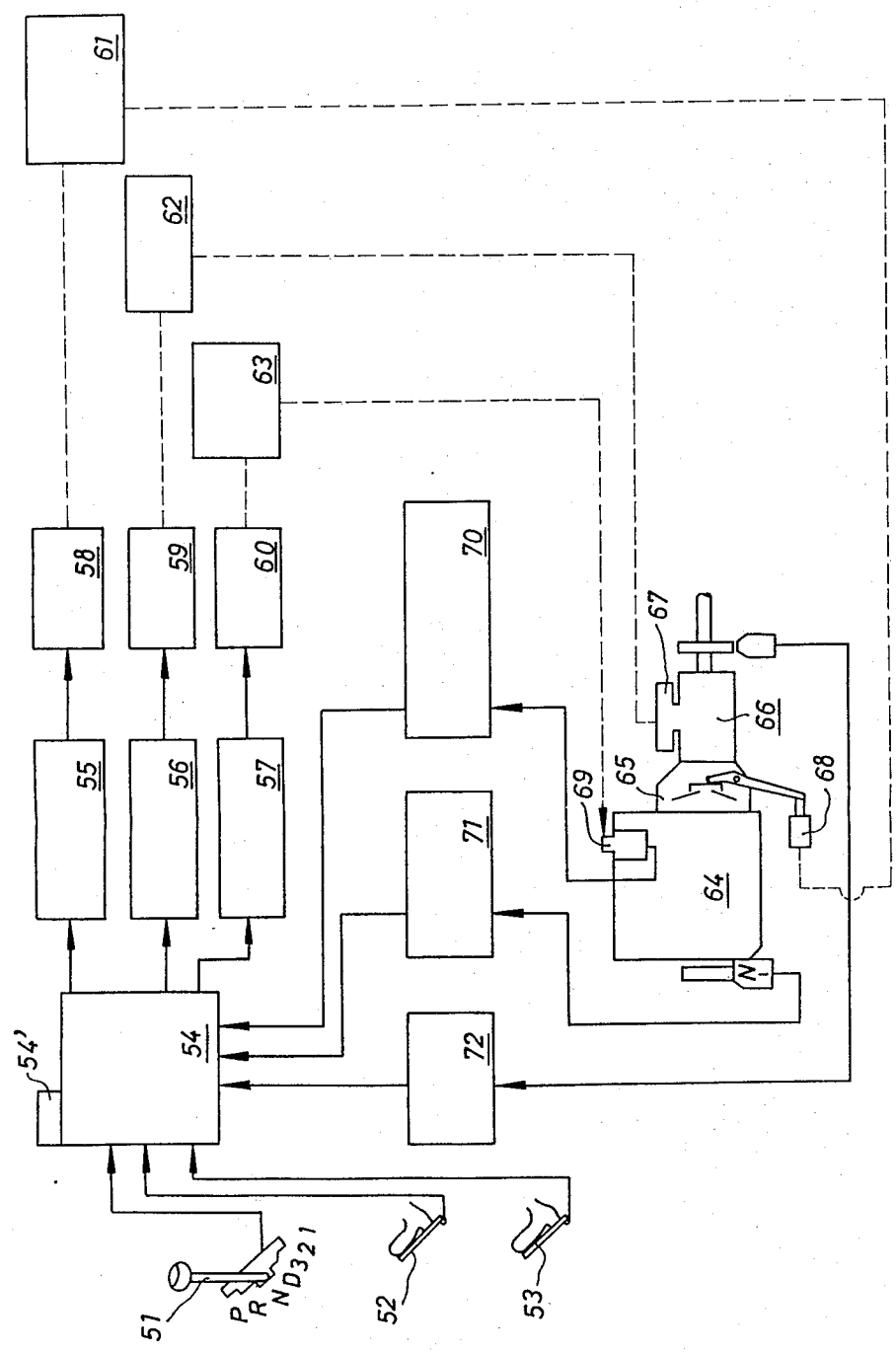
FIG. 4 is a general arrangement diagram.

In FIG. 4, 51 is a change lever, 52 is an acceleration pedal, 53 is a brake pedal, 54 is a control unit, 54' is a modulation switch, 55 is a clutch control signal, 56 is a gear control signal, 57 is a throttle control signal, 58 to 60 are solenoid valves, 61 is an air tank, 62 is a power gear shifter, 63 is an amplifier, 64 is an engine, 65 is a clutch, 66 is a transmission, 67 is a power gear shifter, 68 is a clutch slave cylinder, 69 is an engine speed control servo motor, 70 is a throttle valve opening detector, 71 is an engine rotational speed detector, and 72 is a vehicle speed detector.

As described above, in this invention; in the automatic speed-change control method for the self-movable vehicle which is so deviced that, during running of the self-movable vehicle of the type that the power of the engine 64 is transmitted to the driving wheels through the clutch 65 and the finite-stage gear speed changer 66, the speed change ratio $\gamma$ (or $\gamma^*$) is calculated from both the actual vehicle speed $w_\theta$ and the acceleration pedal stepping value u, the clutch is disengaged (C=1) after detecting the above speed-change ratio $\gamma$ having been equal to the next step preset speed-changing ratio $\gamma_{i\text{-}next}$ (or $\gamma_{i\text{-}next}*$), the next gears are meshed with a prescribed time delayed (G=G$_{i\text{-}next}$), and the clutch is engaged with a further prescribed time delayed (C=0); only when the acceleration pedal stepping value is detected to be zero u=0 during running of the vehicle on a high-speed stage and at the same time the actual vehicle speed is larger than a prescribed preset vehicle speed V'$_i$ at which the gear mode is to be changed to a low-speed stage, the gear mode is forcibly changed to the low-speed stage (G=G$_i$−1) to enable the engine brake to function more effectively. Therefore, in case of decelerating the vehicle during running thereof, the gear mode can be automatically changed to a low-speed side as required (when the vehicle speed w$_\theta$ is larger than the preset speed V'$_i$) by only bringing the acceleration pedal stepping value u to zero. Consequently, not only a sufficient engine brake effect is obtainable to provide an easy braking of vehicle but a disadvantage of abuse of a brake mechanism such as a foot brake etc. can be avoided.

Figure 5:
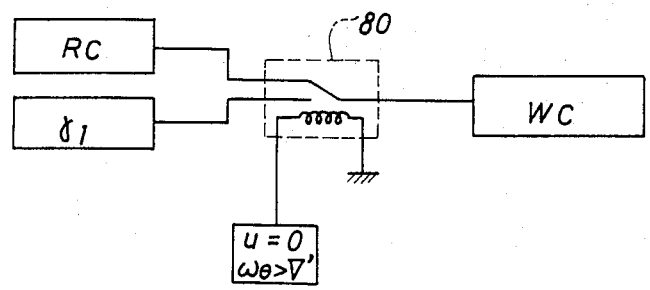
FIG. 5 is a forcible speed-change circuit diagram for a two-stage speed-change.

Incidentally, when this invention is applied to a two-stage speed change in emboding the present invention, installation of a forcible speed-change circuit of FIG. 5 in the relay actuating circuit 9 will enable the present invention to be embodied by adding a very simple circuit thereto. In FIG. 5, an output from a speed-change ratio detecting circuit RC is normally fed to a window-type comparator circuit WC, a relay 80 functions to send a signal of the first-stage peset speed-change ratio $\gamma_1$ to the window-type comparator circuit WC only when the vehicle speed w$_\theta$ becomes larger than V'$_2$ with the acceleration pedal stepping value u=0, and the normally-open relay 1 corresponding to the first-stage closes to execute the forcible speed-change to the first-stage automatically as shown by FIG. 3.

What is claimed is:

1. A method of automatic speed change control for a self movable vehicle wherein, during running of a self movable vehicle of a type that power of an engine is transmitted to driving wheels through a clutch and a finite stage gear speed changer:
   determining actual speed of the vehicle;
   determining an acceleration pedal stepping value;
   monitoring a speed change ratio from said actual speed and acceleration pedal stepping value;
   when said acceleration pedal stepping value is detected to be zero during running of the vehicle in a high speed gear stage above a pre-selected vehicle range and when the actual vehicle speed is greater than a prescribed preset vehicle speed at which a gear mode is to be changed to a lower-speed gear stage;
   disengaging the clutch when speed-change ratio is equal to a preset speed-change ratio;
   meshing gears of the transmission following a prescribed time delay from the point in time in which the clutch was disengaged;
   re-engaging the clutch following a further prescribed time delay; and
   forceably changing the transmission gear mode to a lower-speed stage to enable an engine brake to function more effectively.

2. A method of automatic speed change control for a self movable vehicle as defined in claim 1 and further comprising the step of:
   selecting a speed change ratio matching with the accelerating pedal stepping value and the engine rotational speed from actual step like speed change ratios of said gear speed changer.

3. A method of automatic speed change control for a self movable vehicle as defined in claim 2 and further comprising the steps of:
   when starting the vehicle, disengaging the clutch after detecting the actual vehicle speed being zero and shifting the gear mode to a start stage for waiting.

4. A method of automatic speed change control for a self movable vehicle as defined in claim 3 and further comprising the steps of:
   when the vehicle is running with an acceleration pedal stepped, detecting the actual vehicle speed to determine engine rotational speed at which the gear mode is to be changed to the next stage; and disengaging the clutch when the difference between the engine rotational speed and the engine rotational speed t which the gear mode is to be changed becomes approximately zero.

5. A method of automatic speed change control for a self movable vehicle as defined in claim 1 and further comrpising the steps of:
   when the acceleration pedal stepping value is detected to be zero and concomitantly the actual vehicle speed is determined to be greater than a prescribed value, disengaging the clutch, shifting the gear mode to a neutral stage and re-engaging the clutch after the gear mode is shifted to a neutral stage;
   disengaging the clutch after meshing gears are synchronized by forcibly changing a throttle opening independently of the acceleration pedal stepping value; and
   thereafter, shifting the gear mode from the neutral stages to one stage lower in speed to ensure smooth clutch engagement.

6. A method of automatic speed change control for a self moveable vehicle as defined in claim 1 wherein:
   when the acceleration pedal stepping value is detected to be zero and concomitantly the actual vehicle speed is determined to be greater than a prescribed value, disengaging the clutch, shifting the gear mode to a neutral stage and re-engaging the clutch after the gear mode is shifted to a neutral stage;
   disengaging the clutch after meshing gears are synchronized by braking; and
   thereafter, shifting the gear mode from the neutral stage to one stage lower in speed to ensure smooth clutch engagement.

7. A method of automatic speed change control for a self moveable vehicle as defined in claim 1 and further comprising the steps of:
   utilizing an automatic speed change control circuit including thyristers of a quantity corresponding to a number of speed change stages;
   utilizing of the thyrister energizing a corresponding gear operating solenoid valves, and
   meshing a gear train to provide a speed change ratio specified by a window-type comparator.

* * * * *